Figure 1:
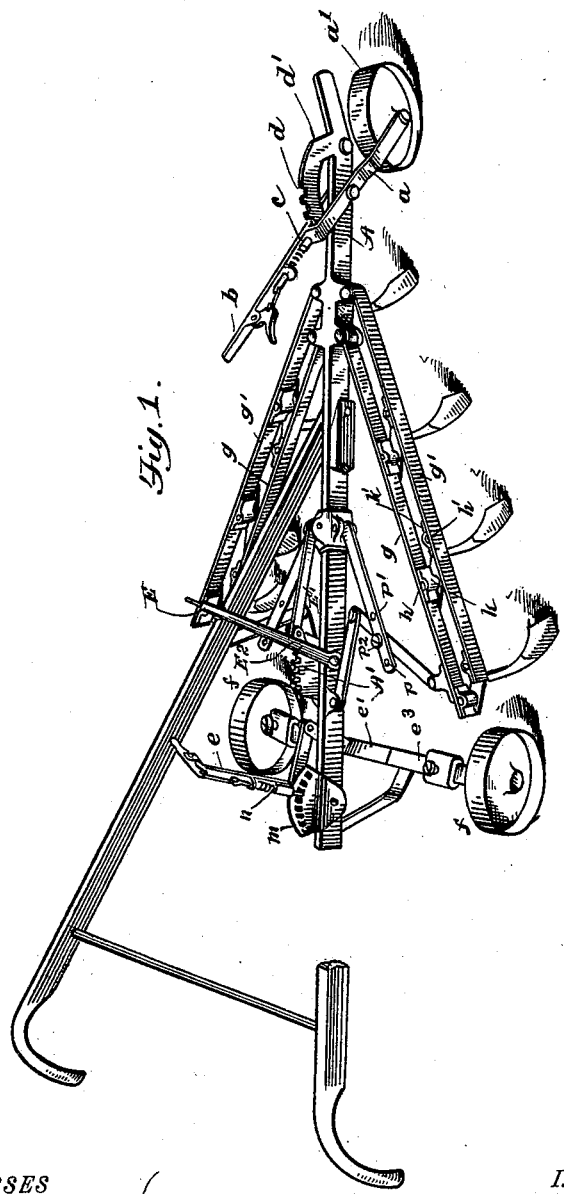

(No Model.)  2 Sheets—Sheet 1.

E. D. BARLING.
CULTIVATOR.

No. 595,900. Patented Dec. 21, 1897.

WITNESSES
D. H. Bradford
Virginia M. Clough

INVENTOR
Elliott D. Barling
By Parker & Burton
Attorneys.

(No Model.) 2 Sheets—Sheet 2.
E. D. BARLING.
CULTIVATOR.
No. 595,900. Patented Dec. 21, 1897.
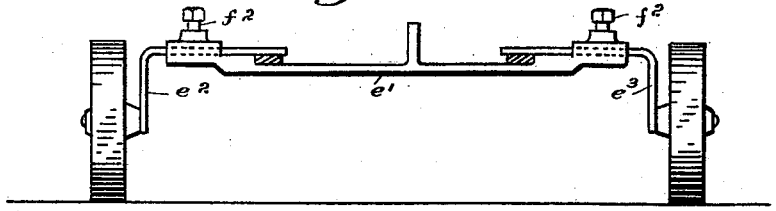
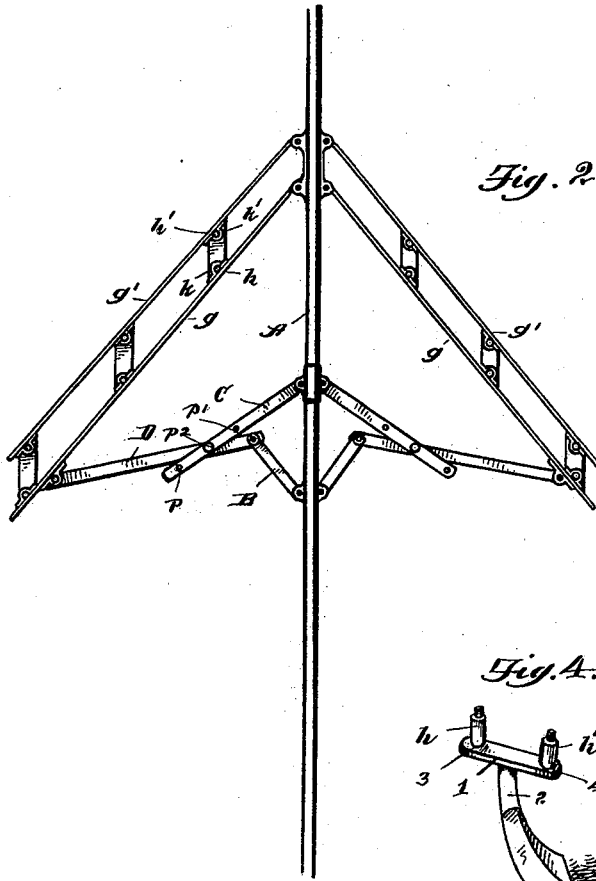
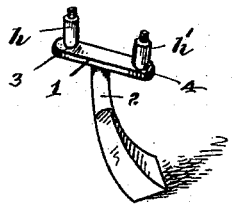

UNITED STATES PATENT OFFICE.

ELLIOTT D. BARLING, OF PONTIAC, MICHIGAN.

CULTIVATOR.

SPECIFICATION forming part of Letters Patent No. 595,900, dated December 21, 1897.

Application filed August 14, 1896. Serial No. 602,699. (No model.)

*To all whom it may concern:*

Be it known that I, ELLIOTT D. BARLING, a citizen of the United States, residing at Pontiac, county of Oakland, State of Michigan, have invented a certain new and useful Improvement in Cultivators; and I declare the following to be a full, clear, and exact description of the invention, such as will enable others skilled in the art to which it pertains to make and use the same, reference being had to the accompanying drawings, which form a part of this specification.

This invention relates to cultivators, and has for its object improvements in that class of harrows in which the wing parts of the frame are hinged to the mid-rib and are arranged to be spread from or contracted toward the mid-rib to accord with the work on which the cultivator is employed.

In the drawings, Figure 1 is a perspective. Fig. 2 is a plan. Fig. 3 is a rear elevation of the truck-wheels. Fig. 4 shows a tooth in detail.

A indicates the mid-rib, to the forward end of which is pinned a lever $a$, that carries at its lower end a wheel $a'$ and at its upper end an arm $b$ and spring-actuated pawl $c$, that is arranged to engage with any one of a series of notches $d$ in a quadrant $d'$. At the rear end of the mid-rib is a similar lever $e$, that carries at its lower end a cross-bar $e'$, with which engage two adjustable half-axles, each of which carries a journal for a wheel. The two wheels $f f'$ comprise the rear part of the truck. The half-axles $e^2 e^3$ engage with the cross-bar $e'$ by sliding joints and are held securely in place when adjusted by set-screws $f^2 f^2$. The entire cross-bar and wheels carried by it may be adjusted vertically by the lever $e$, quadrant $m$, and pawl $n$. The adjustment of the three truck-wheels may be varied to such a degree as to, on the one hand, lift the teeth of the cultivator entirely out of the ground or the cut of the teeth may be regulated as desired. By the horizontal adjustment the wheels can be made to track behind a given tooth or between teeth, as may be desired, and the independent adjustment of the front wheel and the hind wheels enables the user to make a variation in depth of cut between front and rear teeth, if desired.

Each wing-piece of the frame is composed of two parallel bars $g g'$, each of which is hinged independently to the mid-rib, and each tooth is provided with two journals $h h'$. Journal-bearings $k k'$ are arranged on the parallel bars, the bearings for each tooth being so arranged that a line drawn from the one to the other is parallel to the mid-rib. Thus the vertical axis of the tooth will always remain unchanged with respect to the mid-rib and the shovel-blades of the teeth will always be presented in the same way to the work. The rear ends of the wing-pieces are connected to the mid-rib by the jointed bars. (Seen best in Fig. 2.) Of these the bar B is hinged to the mid-rib, the bar C is hinged to a runner that slides on the mid-rib, and the bar D is hinged to the wing. The bar D is also held by pins to both B and C. A lever E, hinged to the mid-rib, is connected by a rod E' to the runner and engages by means of a pawl $E^2$ to the quadrant A'. The breadth or spread of the wings is regulated by means of this lever. A greater range of spread than otherwise would be attainable is produced by the use of a number of pin-holes $p p' p^2$, any one of which may be used, as desired.

This cultivator can be used for cultivating between narrow rows of vegetables or it can be widely spread and used as a harrow, if desired. Any desired shape of tooth can be employed if only each is provided with the double journals described. The details of construction of the teeth may vary, but I find a useful and cheap construction to be that shown in Fig. 4, in which I indicates a flat plate, on the under side of which is a lug 2, to which the shovel part of the tooth is bolted or otherwise secured. Through the plate are two holes 3 4, through which pass bolts $h h'$, that are utilized as the journals of the tooth. Such a construction is economical and the parts of it most exposed to wear are readily renewed.

What I claim is—

1. In a harrow, the combination of a midrib and side wings hinged thereto in pairs, and harrow-teeth provided each with two journals and adapted to be journaled to both members of a wing whereby the axis of the teeth is not turned when the wing is adjusted, substantially as described.

2. In a harrow, the combination of a midrib, a wing composed of two members arranged as parallel bars, a harrow-tooth provided with two journals adapted to engage bearings on the bars of the side wing, and means for adjusting the spread of the wing-bars, substantially as described.

3. In a harrow-tooth, the combination of the blade and a shank provided with two journals adapted to be engaged in separate bearings, substantially as described.

In testimony whereof I sign this specification in the presence of two witnesses.

ELLIOTT D. BARLING.

Witnesses:
J. E. SAWYER,
J. C. GAYLORD.